July 23, 1963

L. LEWIS 3,098,807

HIGH ENERGY RATE EXTRUSION OF URANIUM

Filed Sept. 22, 1961

INVENTOR.
LAWRENCE LEWIS
BY

July 23, 1963 L. LEWIS 3,098,807
HIGH ENERGY RATE EXTRUSION OF URANIUM
Filed Sept. 22, 1961 2 Sheets—Sheet 2

INVENTOR.
LAWRENCE LEWIS
BY

United States Patent Office 3,098,807
Patented July 23, 1963

3,098,807
HIGH ENERGY RATE EXTRUSION OF URANIUM
Lawrence Lewis, Bridgeport, Conn., assignor to the United States of America as represented by the United States Atomic Energy Commission
Filed Sept. 22, 1961, Ser. No. 140,654
3 Claims. (Cl. 204—154.2)

The present invention relates in general to uranium forming operations, and in particular, is directed to a new and improved method of extruding natural uranium tubes which may subsequently be machined to size, clad, and used as fuel elements in nuclear reactors.

Heretofore it has been customary to prepare tubular fuel elements by extruding uranium in the alpha phase. Alpha working, however, imparts a preferred orientation to the metal which causes dimensional instability during irradiation. Grain refinement of the uranium has therefore been a necessary requirement for satisfactory reactor performance. Such refinement has been obtained by heating the uranium into the beta phase and then rapidly cooling it through the beta-alpha phase transformation. Additional refinement of rapidly cooled uranium may be obtained by a recrystallization process during a brief anneal in the high alpha phase. Extrusion in the beta phase is not practical because uranium in this phase is brittle and fractures while being extruded.

It is the object of this invention to eliminate the heating of alpha-phase extruded natural uranium as a separate step in the manufacture of nuclear fuel elements with resulting economies.

The foregoing object is achieved by a method wherein uranium is heated to a predetermined temperature in the range of 1000° F.–1100° F. and extruded at a high energy rate. Uranium extruded by the present invention automatically transforms from the alpha to the beta phase on exiting from the die. Rapid cooling of the metal, as by water quenching produces the desired random crystallographic orientation and fine grain size required for reactor use.

Examples of uranium tubing extruded according to this method are illustrated in the figures, wherein FIGS. 1 and 2 are photomacrographs of sections of a thin-walled uranium tube extruded at 1000° F. and at a high energy rate.

Figure 5:
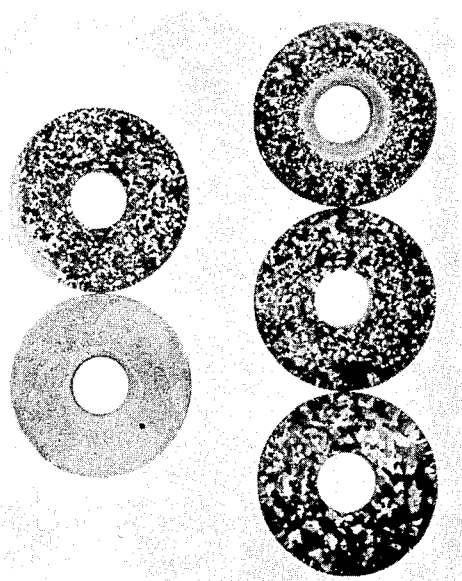
Figure 6:
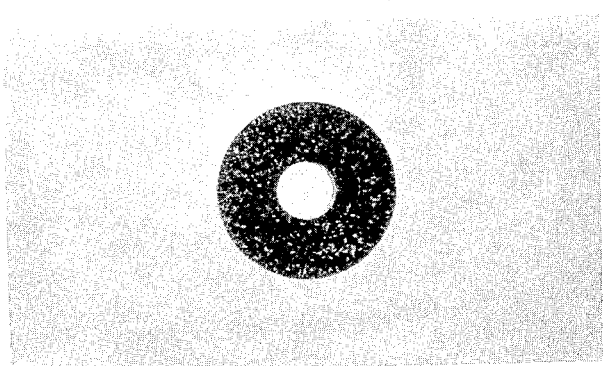

FIGS. 5 and 6, respectively, show the degree of grain refinement obtainable by compressed air cooling and water quenching the extruded tubing.

The achievement in one operation of alpha-phase extrusion with an automatic transformation to the beta phase is deemed to be due to an increase in the alpha-beta phase transformation temperature by about 150° F. (65° C.) from 1238° F. (670° C.) to approximately 1355° F. (735° C.) in accordance with the solid-solid state phase change defined by the Clausius-Clapeyron equation:

$$\frac{dT}{dP} = \frac{T \Delta V \text{ tr.}}{\Delta H \text{ tr.}}$$

in which T is the temperature, P the pressure, $\Delta V$ the changes in volume and $\Delta H$ the change in heat content. An increase in the molal volume change for alpha to beta uranium induces a rise in the transformation temperature under extreme pressure. Thus, although the extrusion takes place at about 1300° F. (704° C.), the metal is nevertheless formed in the ductile alpha phase. Exiting from the die and relieved of the extreme pressures imposed on it, the uranium tube enters the beta phase as the transformation temperature suddenly decreases. On cooling, the uranium retransforms to the alpha phase.

It should be noted that the initial temperature of the uranium billet should be sufficiently high in the alpha temperature range so that the uranium on leaving the die will transform to the beta phase. On the other hand, the temperature of the billet must be low enough to insure that it does not transform to the beta phase while in the die, since in the latter case the extrusion will be unsuccessful.

In practice it has been found that a suitable temperature range for extruding uranium tubing is 1000° F. to 1100° F. The extrusion is performed in a conventional high energy press having a ram speed of about 750–960 inches per second. At a 5:1 reduction ratio, the uranium extrusion speed is about 3700 to 4800 inches per second. The pressure applied to the nitrogen gas introduced into the fire pressure cylinder of the extrusion process is approximately 1900 to 2000 p.s.i.

The following example illustrates the extrusion of thin-walled uranium tubing by the present method:

EXAMPLE I

Extrusion slugs were derived from three 7.00″ x 2.00″ x 21″ natural uranium billets. The billets were ingot in nature and of reactor grade quality. Two billets were extruded employing conventional alpha phase techniques to the following pre-cut and pre-machined size:

Type I (Rough)

3.100″ O.D.
1.250″ I.D.
120.00″ long

The two tubes were warm roll-straightened at 375° F. allowed to cool and then sawed to rough slug length. These were then machined to final slug size as follows:

Type I (Final Size)

2.932″±.005″ O.D.
1.490″±.005″ I.D.
2.000″±.010″ long
⅛″ radius O.D. and I.D., one end only A conventional high energy extrusion press was used for the extrusion. The press was capable of generating 160,000 ft.-lbs. of energy at full fire pressure. Auxiliary equipment included a furnace employed to heat the slugs to extrusion temperature under a protective argon atmosphere at a flow rate of 40 cubic feet per hour. Lubrication of tooling and slugs was achieved through a sprayed application of an aluminum graphite suspension in a quick evaporating organic solvent. The lubricant was applied to preheated tooling and to the slug after removal from the furnace.

Slug transfer from furnace to extrusion press was done manually with tongs, and was held to 10 seconds or less.

Extrusion temperatures ranged from 700° F. to 1100° F. (371° C.–593° C.), fire pressure from 1200 p.s.i.–2000 p.s.i. and extrusion ram speed from 620 in./sec. to 810 in./sec. Use was made of machined carbon follower blocks to facilitate complete ejection of the tube during extrusion. Tubes ejected from the die were trapped without damage in a catch tube stuffed with rock wool. Follower blocks appear to be required in order to completely extrude the uranium. Without follower blocks a butt is retained in the die. The butt acts as a brake and produces an almost instantaneous deceleration of the tube, resulting in occasional fracture of the tube.

Figure 1:
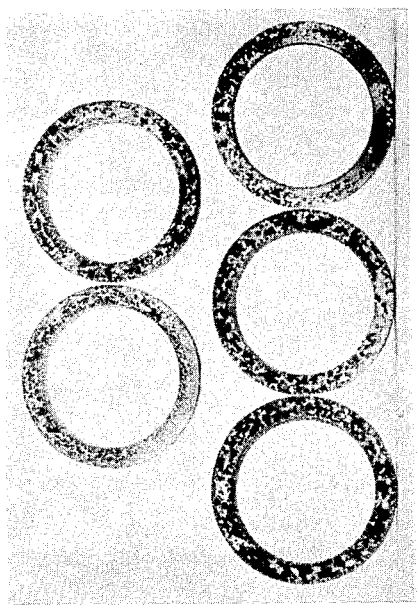
Figure 2:
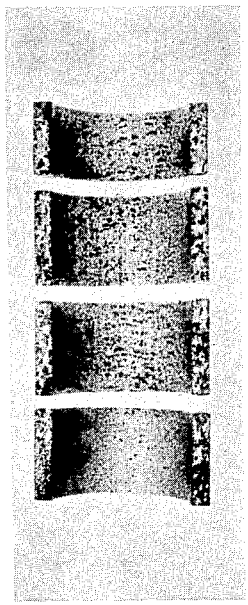

Details of a specific extrusion are given in the following table. Transverse and longitudinal macrostructures developed in this extrusion (Tube No. 21) show the characteristic structure of beta phase uranium and are illustrated in FIGS. 1 and 2.

TABLE 1

| Tube No. | Billet History | Heating time, minutes | Extrusion Temperature °F. | Extrusion Temperature °C. | Fire Pressure (p.s.i.) | Ram Speed (i.p.s.) | Die Design | Remarks |
|---|---|---|---|---|---|---|---|---|
| 21 | Alpha extruded | 45 | 1,000 | 538 | 1,900 | 785 | 1.926″ I.D., 35° angle, ⅛ R.3° T. | .670″ carbon follower used. Tooling preheated to a higher T. Tube entered beta phase. |

Note.—Ram Weights—1,888 lbs. Ram stroke—11 inches. R=radius; T=rear end die taper.

Heavier walled uranium tubing may also be successfully extruded according to the present method, as shown in the following example:

EXAMPLE II

The raw material for this experiment consisted of ingot stock extruded to rough slug size and divided into two types, one having flat faces and the other having a conical face on one end. Slugs of the former type were machined to the following dimensions:

2.932″±.005″ O.D.
0.435″±.005″ I.D.
2.000″±.010″ long

Slugs of the latter type were of similar dimensions but had one 30° (120° included) conical end.

The two types of slugs were then divided into three groups. Group I slugs were alpha phase extruded; Group II slugs were alpha phase extruded and triple beta quenched and alpha phase annealed after extrusion. The beta quench consisted of heating the slugs at 760° C. (1400° F.) for one hour and then brine quenching at 100° F. or less. Group III slugs were produced through an alpha phase extrusion of a triple beta quenched 7″ O.D. hollow ingot.

The billets were heated in an argon atmosphere and extruded as in Example I. Slugs extruded in this manner exhibited a transformation into the beta phase. Details of the extrusion are given in the following Table 2.

TABLE 2

| Push and Tube No. | Billet No. | Group | Billet Temperature °F. | Billet Temperature °C. | Heating Time (min.) | Fire Pressure (p.s.i.) | Energy, Ft-lbs. (10³) | Ram Speed (i.p.s.) | Remarks |
|---|---|---|---|---|---|---|---|---|---|
| 25 | 34 | II | 1,000 | 538 | 65 | 1,900 | 128 | 940 | Cone face first-extruded in one piece. Practically no butt. |
| 26 | 36 | II | 1,000 | 538 | 55 | 1,900 | 128 | 940 | Cone face rear-extruded in one piece; very small butt left. |
| 23 | 9 | I | 1,050 | 566 | 30 | 1,950 | 132 | 960 | Cone face first-extruded in one piece. |
| 6 | 23 | II | 1,100 | 593 | 35 | 1,900 | 128 | 940 | Flat faced billet. Compressed air cooled. Did not fully extrude. |

Figure 3:
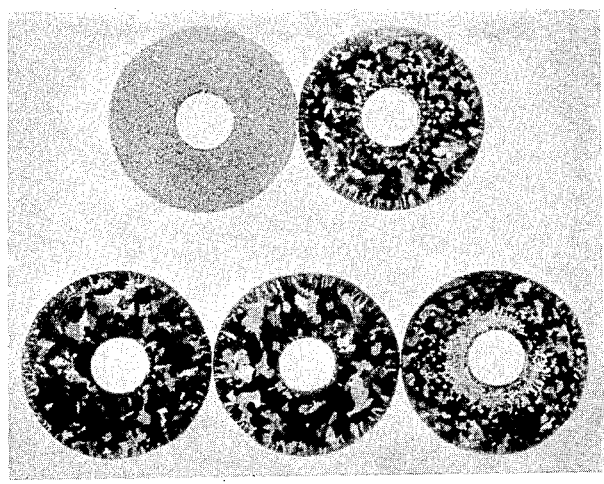
FIG. 3 is a photomacrograph of sections of a thick-walled uranium tube extruded at 1000° F. at high energy.

The extrusion of billet No. 34 at 1000° F. exhibits a characteristic beta phase structure as shown in transverse macrostructures, FIG. 3. This structure is predominant from the quarter to rear sections and manifests itself as a columnar outer diameter structure together with loss of interior grain boundary regularity.

Figure 4:
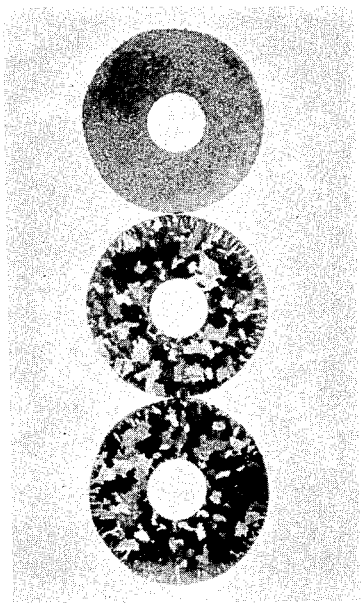
FIG. 4 is a photomacrograph of sections of a tube extruded at 1100° F.

The extrusion at 1100° F. likewise shows the characteristic beta phase structure. When air cooled, the extruded slug is coarse grained as shown in FIG. 4. A finer grain structure is achieved by compressed air cooling of the slug as shown in FIG. 5, whereas water quenching (FIG. 6) creates a relatively fine structure of beta phase origin when compared to conventional heat treatment. This is a significant advance, as the combination of random orientation and fine grain structure so produced not only eliminates the need for beta phase heat treatment after extrusion but produces a superior grain structure.

Experience has shown that extrusions are preferably made in the temperature range 1000° F. to 1050° F. (538° C. to 566° C.). While billets have been successfully extruded at 1100° F., most extrusions at this temperature or above were unsuccessful as evidenced by tube fracture, regardless of the fire pressure. It is believed that repeated failure of tubes above 1100° F. represents a condition peculiar to phase changes in uranium. Similarly, extrusions at temperatures below 1000° F. failed to transform into the beta phase on emerging from the die.

The present invention produces uranium tubing of a superior crystallographic structure and eliminates the step of heating the uranium to the beta phase after extrusion. The elimination of this step effects economies in the manufacture of natural uranium fuel elements both in cost and time, besides eliminating the danger of hydrogen contamination of the uranium, which is a problem when uranium is heated to the beta phase and quenched by conventional methods.

What is claimed is:

1. The method of forming fine grained randomly oriented natural uranium suitable for reactor fuel, that comprises heating a preformed natural uranium slug to a temperature of about 100° F.–1100° F.; immediately extruding the slug at a pressure to cause a rise in the alpha-beta phase transformation temperature in accordance with the Clausius-Clapeyron equation and at a temperature intermediate the normal and the increased alpha-beta transformation temperature, to form uranium in the alpha phase; permitting the uranium to transform to the beta phase after extrusion, and rapidly cooling the uranium.

2. The method of claim 1 wherein the uranium is cooled by liquid quenching.

3. The method of forming fine grained randomly oriented natural uranium tubing suitable for reactor fuel that comprises heating a preformed hollow natural uranium slug to a temperature of about 100° F.–1100° F.; extruding the heated billet at a pressure of about 1900–

2000 pounds per square inch, a ram speed of about 750–960 inches per second and a reduction ratio of 5:1 whereby the slug is formed into tubing in the alpha phase; permitting the tubing to transform to the beta phase after extrusion; and rapidly cooling the tubing.

References Cited in the file of this patent

Nuclear Metallurgy. Vol. IV, November 6, 1957, published by AIME Institute of Metals Division, pp. 87–94.